Jan. 16, 1962 G. E. MATHER 3,017,171
HEAVY DUTY SPRING ASSEMBLIES
Filed Dec. 16, 1959
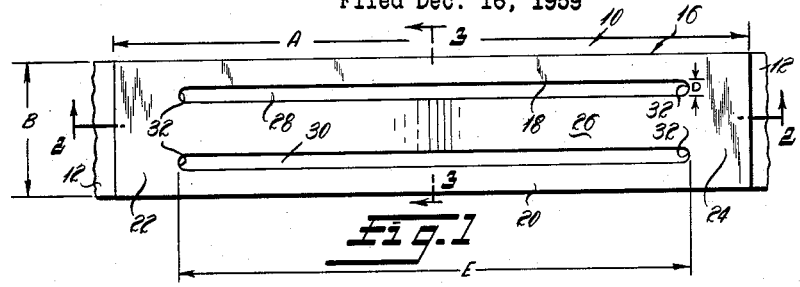
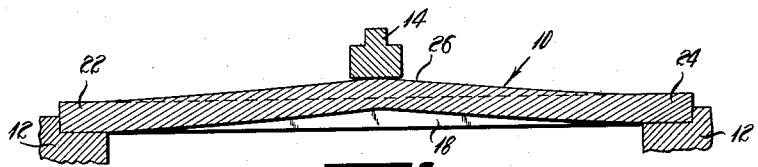
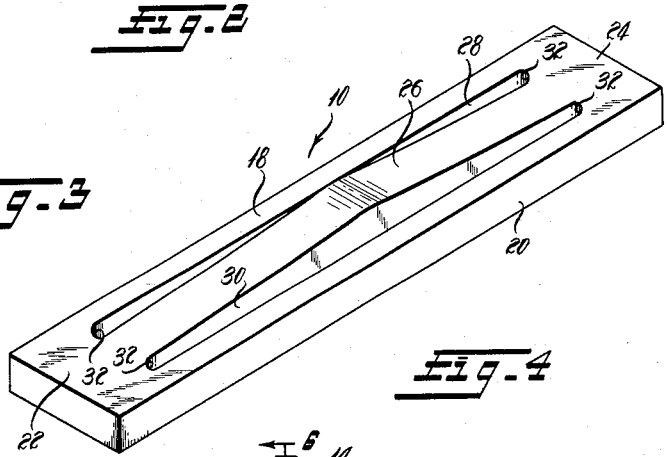
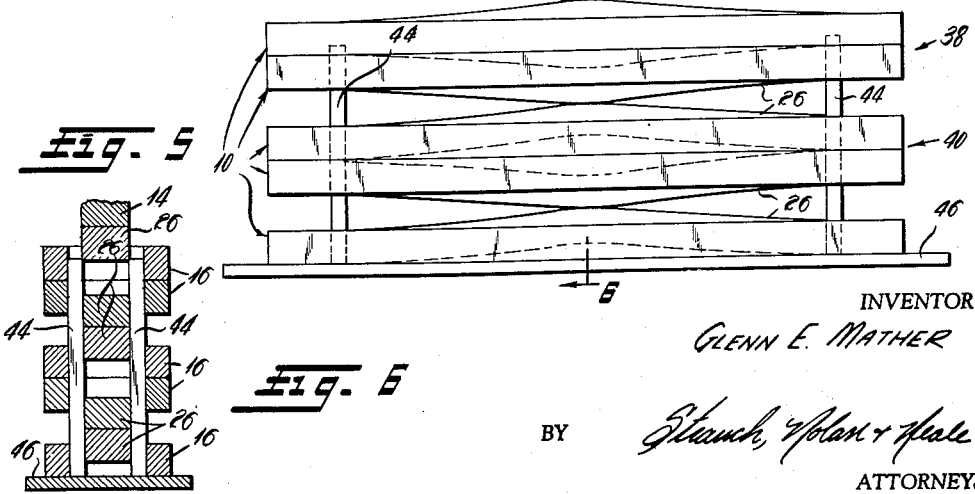
INVENTOR
GLENN E. MATHER
BY
ATTORNEYS United States Patent Office 3,017,171
Patented Jan. 16, 1962

1

3,017,171
HEAVY DUTY SPRING ASSEMBLIES
Glenn E. Mather, Logansport, Ind., assignor to Rockwell-Standard Corporation, Coraopolis, Pa., a corporation of Pennsylvania
Filed Dec. 16, 1959, Ser. No. 860,009
8 Claims. (Cl. 267—1)

The present invention relates to springs and more particularly to compact composite semi-elliptical type leaf springs capable of supporting heavy loads between fixed supports in a restricted space.

A preferred application of the present invention is in connection with resiliently supporting heavy machine parts wherein the space available for the supports is very small.

The present invention contemplates a small one-piece composite leaf spring having a pair of parallel longitudinal slots to provide a substantially elliptically cambered spring strip between the slots for centrally supporting a heavy concentrated load within a relatively small space and without excessive elongation of the overall dimensions of the spring. The spring, according to the present invention, is supported as a beam and rests on spaced apart supports with the load applied generally midway between the supports.

Accordingly with the foregoing purposes and considerations in mind, it is the major object of this invention to privide a resilient spring support for supporting a concentrated load between two spring support members wherein the elongation of the spring is negligible.

A further object of the invention is to provide a novel one-piece composite semi-elliptical leaf spring having a stiff section and a load-supporting flexible section wherein the stiff section consists essentially of a rugged undeflectable rectangularly shaped frame and the flexible section consists essentially of a uniformly elliptically cambered spring strip uniformly and equidistantly spaced between the side members of the frame and normally joined to the end members of the frame.

Still another object of the present invention is to provide a novel one-piece composite semi-elliptical leaf spring having a large energy storing capacity and capable of supporting a heavy load within a confined space.

A further object of the invention is to provide a novel one-piece composite semi-elliptical leaf spring that is small, unusually simple in construction, rugged and adapted to be supported as a simple beam between two supports for carrying a heavy load midway between the supports.

Further objects of the invention will appear as the description proceeds in connection with the appended claims and the annexed drawings wherein:

FIGURE 1 is a plan view showing a composite spring supported as a simple beam spanning two spaced support members according to one embodiment of the present invention;

FIGURE 2 is a section substantially along line 2—2 of FIGURE 1 and showing a load member applied midway between the spring supports;

FIGURE 3 is a section substantially along line 3—3 of FIGURE 1;

FIGURE 4 is a perspective view of the composite spring shown in FIGURE 1;

FIGURE 5 is an elevational view showing a composite spring assembly according to a further embodiment of the present invention; and FIGURE 6 is a section substantially along the lines 6—6 of FIGURE 5.

Referring now to the drawings and more particularly to FIGURES 1, 2 and 4 wherein the construction embodying the principles of the present invention is illustrated, a one-piece composite semi-elliptical leaf spring generally designated at 10 is shown to be suspended between two suitable spaced apart support pillars 12 as a simple beam and to be supporting a relatively concentrated load member 14 (FIGURE 2) midway of the pillars.

Spring 10, as shown in FIGURES 1–4, basically consists of a rigid undeflectable section and a relatively deflectable section. The rigid section consists essentially of a stiff flat-sided rectangular shaped frame base 16 of appreciable thickness having parallel spaced apart side members 18 and 20 and parallel end members 22 and 24, perpendicularly joining the adjacent ends of the side members 18 and 20. The widths of side members 18 and 20 indicated by dimension G (FIGURE 3) are equal and uniform. Similarly, the width of end members 22 and 24 are also uniform and equal, and the thickness of the base 16 is of such magnitude so as to make the base rigid particularly under application of load.

The flexible section of spring 10 consists essentially of a central longitudinally extending spring strip 26 uniformly and equidistantly spaced apart from side members 18 and 20 in parallel relation thereto. The ends of spring strip 26 intersect and integrally join to end members 22 and 24 midway of side members 18 and 20 so as to form two parallel spaced apart closed longitudinal co-extensive slots 28 and 30 of the same length. By this structure it will be appreciated that slots 28 and 30 are of uniform width and are equidistantly spaced from the adjacent edges of side members 18 and 20 respectively.

As best shown in FIGURE 2, spring strip 26 is uniformly centrally elliptically cambered outwardly in the direction of load application starting from uniform radii 32 at adjacent ends of slots 28 and 30 and equidistantly from the end edges of base 16. The camber height of spring strip 26 is of such magnitude to provide maximum load capacity and the rigid flat side members 18 and 20 function to restrain the elongation of spring strip 26 when a concentrated load such as load member 14 is centrally applied thereon so as to augment the load capacity of the spring strip.

As shown in FIGURE 3, the thickness of spring strip 26 is uniform and equal to that of rigid base 16 and the cross-sectional area of spring strip 26 is equal to the aggregate sum of both cross-sectional areas of side members 18 and 20 respectively. Thus it will be appreciated that spring 10 by the above described construction is symmetrical about a line extending normally to and midway of side members 18 and 20.

By means of this construction, the stress distribution in side members 18 and 20 is of equal magnitude and is generally in tension due to the deflection of spring strip 26 under load and its resulting elongation. The compressive stress established in spring strip 26 by the restraining force exerted by rigid side members 18 and 20 is equal to the combined stress in both side members when the spring is compressed flat. The effect of the semi-elliptic shape of spring strip 26 and the cantilever effect on both ends of strip 26 establishes a compressive stress in the top fibers of member 26 that is equal in magnitude to approximately one-third of the stress uniformly distributed in side members 18 and 20 and the bottom fibers of spring strip 26 are stressed in compression to a magnitude of approximately the remaining two-thirds of the stress distributed in side members 18 and 20.

In resisting a centrally applied load on spring strip 26, only strip 26 due to the construction of spring 10 is deflected and side members 18 and 20 of base 16 remain flat and substantially unelongated on supports 12.

A further embodiment of the present invention is illustrated in FIGURES 5 and 6 wherein a series of individual springs 10 as described in the embodiment illustrated in FIGURES 1–4 are stacked together one on top of the other and are of equal dimension so that the springs in the stack are uniformly aligned along their side and end edges.

As best shown in FIGURE 5, alternate springs are inverted so as to provide a series of spring pairs 38 and 40 wherein each of the spring pairs are formed by two springs 10 positioned back to back so that the smooth, flat surfaces of the rigid bases 16 of the top and bottom springs of each pair are in mating surface abutment. In the stack, the top spring of each spring pair is turned upwardly so that its spring element 26 is bowed upwardly while the spring strip of the bottom spring of each spring pair is bowed downwardly. In this manner, load applied to each spring pair is transferred through the rigid frame bases 16 of the top and bottom and springs of each spring pair.

The bottom spring of spring pair 38 has its spring strip 26 centrally supported at the center of the upwardly cambered spring strip 26 of the top spring of spring pair 40 located below spring pair 38. By this structure, the load applied to the central strip of the bottom spring of spring pair 38 is centrally transferred to the spring strip 26 of the top spring of spring pair 40. Load applied to the top spring of spring pair 40 is transferred to the bottom spring of pair 40 through the matingly abutting bases 16 as described with respect to the top spring pair 38.

At the bottom of the stack, a single spring 10 is provided to receive the load transferred through the spring pairs 38 and 40. This spring 10 at the bottom of the stack, is turned right side up so that its spring strip 26 centrally abuts the downwardly turned spring strip 26 of the bottom spring of lower spring pair 40.

Thus, by means of this structure, the load applied at the top of the spring stack is transferred through the rigid frame bases 16 of the springs forming spring pairs 38 and 40, and is transferred from one spring pair to the other spring pair through the centrally abutting opposed spring strips 26 of the bottom spring of pair 38 and the top spring of pair 40 respectively. In this manner, load to and from each spring pair is transferred through the spring strips 26 as opposed to the frame bases, and the load through each spring pair is transferred through the rigid abutting bases of the springs forming the spring pair.

By means of this construction, each spring pair is resiliently supported, and the spring strips 26 of each of the springs 10 making up the stack are thereby utilized to increase the load carrying capacity of the spring assembly.

It will be appreciated that as many spring pairs may be stacked one over the other as desired to support a given load and the top spring of the top pair may be omitted where desired to allow the load to be directly positioned on the rigid base of the next lower spring.

The means for holding spring pairs 38 and 40 and the bottom spring 10 in the stack in place and in alignment comprises a series of upright structural bars 44 perpendicularly fixed at their lower ends to a base 46 and extending upwardly through the aligned longitudinal slots 28 and 30 of each spring 10 in the stack. The width of bars 44 are made to conform to the width of slots 28 and 30 of each spring so as to provide a sliding fit in order to hold the springs in alignment with one another.

From the foregoing description it is apparent that the spring above described is capable of supporting heavy loads in a restricted space. The heavy load carrying capacity is achieved by the combination of a semi-elliptic cantilever effect of a central spring strip and is increased by the restraining action of two side members of base 16 on the central spring strip 26 so as to restrict the elongation of the load supporting spring. The axial elongation of spring 10 under compression is very small and as a practical matter can be neglected so as to permit the spring to support heavy loads in a restricted space.

The overall dimensions of spring 10 above described is relatively very small so as to fit into a confined space. By way of example, the spring of FIGURES 1–4 has a length "A" of 5 inches, a width "B" of 1 inch, a thickness "C" of ¼ inch, a slot width "D" of ⅛ inch, and a slot length "E" of 4 inches, being ½ inch from each end. Central spring strip 26 has a width "F" of ⅜ inch, and a camber height "H" of ⅛ inch. Side members 20 and 18 are uniform and have widths "G" of 3/16 inch.

Preferably spring 10 is formed from an integral piece of steel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a spring assembly, a pair of spaced apart relatively fixed support members and a one-piece spring spanning said support members and carried thereby to resist a centrally applied load, said spring comprising a flat-sided rigid rectangular base having integral side and end members and a central spring strip uniformly cambered in the direction of load application and deflectable by a load applied substantially midway thereon, said strip being centrally and uniformly spaced between said side members and integrally joined at its ends to said end members.

2. In a resilient support assembly, a pair of spaced apart relatively fixed support members and a one-piece spring spanning said members and supportingly carried thereby, said spring having a rigid flat frame base having side and end members and a central uniformly substantially elliptically cambered longitudinally extending strip uniformly spaced from said side members and integrally joined at its ends to said end members, and a load member supported on said strip spring intermediate said support members, said strip being deflectable in resisting said load in a direction opposite to said camber and provide for distribution of stresses in said spring so that said frame remains flat and substantially unelongated.

3. In a resilient support assembly a pair of spaced apart relatively fixed support members, and a one-piece rectangularly shaped spring spanning said members and supported thereby and adapted to carry a centrally applied load, said spring having a rigid flat frame including parallel spaced apart sides extending perpendicularly between parallel sides and a central longitudinally extending uniformly cambered load receiving spring element uniformly spaced from said frame along the sides thereof and integrally joined to the ends of said frame midway of the sides.

4. In a resilient support assembly, a base member, a series of one-piece springs stacked one on top of the other on said base member, each of said springs comprising a stiff undeflectable section and a flexible section deflectable under load, said stiff section consisting essentially of a rigid flat frame having spaced apart end members and parallel side members joining said end members and said flexible section consisting essentially of a uniformly substantially elliptically cambered load supporting spring strip between said side members in parallel spaced apart relationship thereto and joined at its respective ends perpendicularly to said end member, alternate ones of said springs being inverted relative to adjacent ones of said springs in the stack so that the spring strip of said alternate ones of said springs centrally abut the spring strip of the adjacent spring below, and means for holding said springs in place on said base.

5. In a resilient support assembly, a base member, a series of one-piece springs stacked one on top of the other on said base member, each of said springs comprising a flat-sided rigid rectangular base having integral side and end members and a flexible uniformly cambered spring strip centrally and uniformly spaced between said side members and integrally joined to said end members, said springs being stacked to form at least one spring pair composed of an upper spring and a lower spring, said lower spring being inverted relative to adjacent ones of said springs in the stack so that the base of said lower spring abuts the base of one of said springs adjacent thereto and the spring strip of said lower spring abuts the other of the adjacent ones of said springs.

6. The support assembly as defined in claim 5, wherein means are provided for holding said springs in place on said base member.

7. The support assembly as defined in claim 6, wherein said springs are substantially the same size and wherein said means for holding said springs comprise a plurality of straight rigid elongated members perpendicularly secured to said base member and extending upwardly between said side members and said spring strips of each of said springs.

8. A load supporting spring assembly comprising at least one pair of similar spring metal elements mounted one above the other in essentially stacked relation, each spring element being an integral structure consisting of a continuous relatively flat elongated base frame portion with an intermediate longitudinal strip portion joined to the ends of the base frame and cambered out of the plane of the base frame, and means supporting said spring elements in relatively inverted assembly with said intermediate strip portions having their central portions in load bearing contact and otherwise being bowed away from each other.

References Cited in the file of this patent

UNITED STATES PATENTS

| | | |
|---|---|---|
| 2,669,618 | Bradley | Feb. 16, 1954 |
| 2,734,958 | Immel et al. | Feb. 14, 1956 |
| 2,820,120 | Flatt et al. | Jan. 14, 1958 |